(12) United States Patent
Xie et al.

(10) Patent No.: US 11,262,124 B2
(45) Date of Patent: Mar. 1, 2022

(54) SYSTEM FOR PREPARING DEEPLY SUBCOOLED LIQUID OXYGEN BASED ON MIXING OF LIQUID OXYGEN AND LIQUID NITROGEN AND THEN VACUUM-PUMPING

(71) Applicant: XI'AN JIAOTONG UNIVERSITY, Shaanxi (CN)

(72) Inventors: Fushou Xie, Shaanxi (CN); Yanzhong Li, Shaanxi (CN); Jianhua Ren, Shaanxi (CN); Hongwei Mao, Shaanxi (CN)

(73) Assignee: Xi'an Jiaotong University, Xi'an (CN)

( * ) Notice: Subject to any disclaimer, the term of this patent is extended or adjusted under 35 U.S.C. 154(b) by 0 days.

(21) Appl. No.: 17/213,137

(22) Filed: Mar. 25, 2021

(65) Prior Publication Data
US 2021/0300758 A1    Sep. 30, 2021

(30) Foreign Application Priority Data
Mar. 25, 2020  (CN) .......................... 202010216206.3

(51) Int. Cl.
*F25J 3/04*    (2006.01)
*F17C 7/04*    (2006.01)

(52) U.S. Cl.
CPC .............. *F25J 3/0423* (2013.01); *F17C 7/04* (2013.01); *F17C 2221/011* (2013.01); *F17C 2221/014* (2013.01); *F17C 2223/0161* (2013.01); *F17C 2225/0161* (2013.01); *F17C 2225/0169* (2013.01); *F17C 2227/0135* (2013.01); *F17C 2227/0309* (2013.01); *F17C 2227/0358* (2013.01); *F17C 2270/01* (2013.01); *F25J 2290/34* (2013.01)

(58) Field of Classification Search
CPC ........................... F17C 7/04; F17C 2221/011; F17C 2221/014; F17C 2225/0169; F17C 2227/0309; F25J 2290/34; F25J 3/0423
USPC .................................. 62/100, 169, 170, 268
See application file for complete search history.

(56) References Cited

U.S. PATENT DOCUMENTS 6,116,030 A * 9/2000 Story ..................... F04F 5/466
                                                              62/100

FOREIGN PATENT DOCUMENTS

| CN | 1182867 A   | 5/1998 |
|----|-------------|--------|
| CN | 103620330 A | 3/2014 |
| CN | 105605838 A | 5/2016 |
| CN | 105627638 A | 6/2016 |

(Continued)

*Primary Examiner* — John F Pettitt, III
(74) *Attorney, Agent, or Firm* — Wayne IP LLC

(57) ABSTRACT

A system for preparing subcooled liquid oxygen based on mixing of liquid oxygen and liquid nitrogen and then vacuum-pumping, including atmospheric-pressure saturated liquid nitrogen and oxygen tanks. An inlet of the liquid nitrogen tank communicates with pressurized gas, and an outlet is connected to an inlet a of a secondary subcooler. An inlet of the liquid oxygen tank communicates with the pressurized gas, and a first outlet is connected to an inlet b of the secondary subcooler. An outlet c of the secondary subcooler is connected to an inlet d of a primary subcooler. An outlet e of the primary subcooler is connected to a pumping-out device through a rewarming device. A second outlet of the liquid oxygen tank is connected to an inlet n of the primary subcooler. An outlet o of the primary subcooler is connected to an inlet r of the secondary subcooler.

3 Claims, 1 Drawing Sheet

(56) References Cited

FOREIGN PATENT DOCUMENTS

| | | | |
|---|---|---|---|
| CN | 105650459 A | 6/2016 | |
| CN | 106247649 A | 12/2016 | |
| CN | 107923669 A | 4/2018 | |
| CN | 109059419 A | 12/2018 | |
| CN | 109238625 A | 1/2019 | |
| CN | 109469558 A | 3/2019 | |
| CN | 109579351 A | 4/2019 | |
| EP | 0641981 B1 | 11/1998 | |
| EP | 3594554 A1 * | 1/2020 | ............... F17C 9/00 |
| FR | 2933475 B1 | 8/2010 | |
| JP | H0936444 A | 2/1997 | |
| JP | 2015183922 A | 10/2015 | |

* cited by examiner

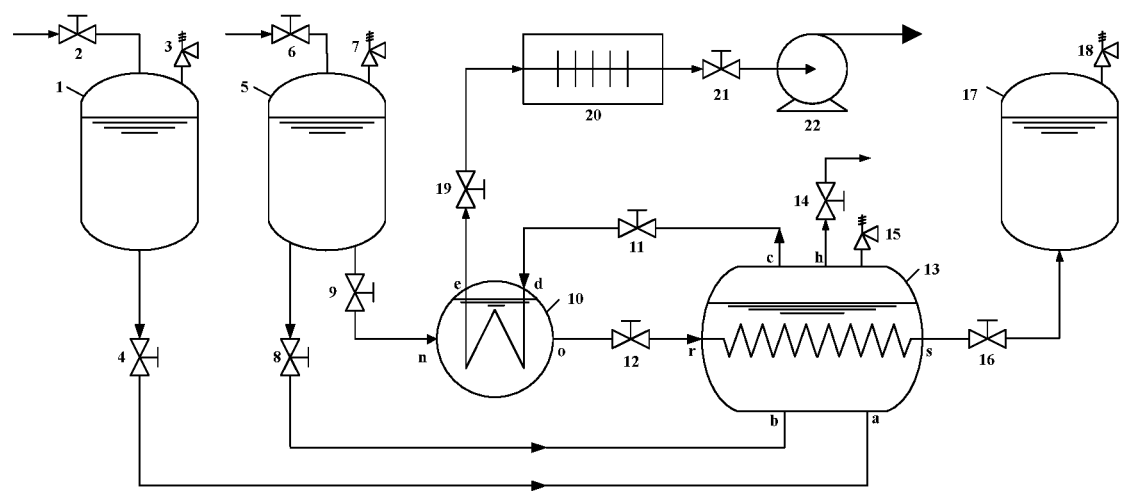

SYSTEM FOR PREPARING DEEPLY SUBCOOLED LIQUID OXYGEN BASED ON MIXING OF LIQUID OXYGEN AND LIQUID NITROGEN AND THEN VACUUM-PUMPING

CROSS-REFERENCE TO RELATED APPLICATIONS

This application claims the benefit of priority from Chinese Patent Application No. 202010216206.3, filed on Mar. 25, 2020. The content of the aforementioned application, including any intervening amendments thereto, is incorporated herein by reference in its entirety.

TECHNICAL FIELD

This application relates to preparation of subcooled cryogenic propellants, and more particularly to a system for preparing a deeply subcooled liquid oxygen based on mixing of liquid oxygen and liquid nitrogen and then vacuum-pumping.

BACKGROUND

Cryogenic liquid hydrogen, liquid oxygen, and liquid methane are the preferred propellants for space travel and deep space exploration due to their high specific impulse, non-toxicity and non-pollution. The cryogenic propellants are needed to be stored in orbit for several months without discharge in future deep space exploration. However, considering the cryogenic characteristic of the liquid propellants, the space heat leakage still will enter a storage tank to vaporize a cryogenic liquid phase even if the best heat insulation method is adopted. This problem can be effectively solved by subcooling the cryogenic propellant from a normal boiling point state to the triple point temperature, that is, the subcooling treatment can increase the ability of the cryogenic liquid to accommodate the space heat leakage and prolong non-loss storage period. In addition, the subcooling treatment can also increase the density of the propellant and decrease the saturation pressure of the propellant, thereby reducing the size and wall thickness of the tank and increasing the payload of launch vehicles.

Based on analysis of thermodynamics, the subcooling of the cryogenic propellants can be performed mainly by a direct heat-exchange method (constant-pressure subcooling), a vacuum-pumping method (reduced pressure subcooling) and a helium bubbling method (concentration difference subcooling). The direct heat-exchange method can be classified into a cryogenic liquid-based heat exchange method and a cryogenic refrigerant-based heat exchange method according to the cooling source, where the former has a relatively poor subcooling efficiency and the latter has a more complicated system and higher cost. The helium bubbling method requires a large amount of precious helium as a working medium, causing a high cost. By contrast, the vacuum-pumping method can subcool the cryogenic working medium to a temperature near the triple point with a readily-available device and low cost, and thus is considered as one of the most feasible strategies to obtain the subcooled cryogenic propellants.

However, for the deeply subcooling of liquid oxygen, the traditional vacuum-pumping method has the following shortcomings. The liquid oxygen has a low triple point temperature (54.4 K), and a low saturation pressure (148 Pa) under the triple point temperature, so that the subcooling of liquid oxygen to this state will lead to large energy consumption. Optionally, the liquid nitrogen is firstly evacuated to its triple point and then used to subcool the liquid oxygen. Though the liquid nitrogen has a relatively high saturation pressure (12.6 kPa) at the triple point temperature, the triple point temperature is only 63.2 K, so that the liquid oxygen can only be subcooled to a state close to 63.2 K and cannot reach a triple point state.

SUMMARY

An object of this application is to provide a system for preparing subcooled liquid oxygen based on mixing of liquid oxygen and liquid nitrogen and vacuum-pumping to overcome defects in the prior art. In the disclosure, a temperature close to a triple point temperature of liquid oxygen can be reached at a higher vacuum pressure after mixing liquid oxygen and liquid nitrogen, achieving a greater subcooling degree of liquid oxygen at a lower vacuum-pumping cost.

Technical solutions of this disclosure are described as follows.

This application provides a system for preparing subcooled liquid oxygen based on mixing of liquid oxygen and liquid nitrogen and then vacuum-pumping, comprising:

an atmospheric-pressure saturated liquid nitrogen tank; and an atmospheric-pressure saturated liquid oxygen tank;

wherein an inlet of the atmospheric-pressure saturated liquid nitrogen tank is communicated with pressurized gas through a first valve; an outlet of the atmospheric-pressure saturated liquid nitrogen tank is connected to an inlet a at a shell side of a secondary subcooler through a second valve; and the atmospheric-pressure saturated liquid nitrogen tank is provided with a first relief valve;

an inlet of the atmospheric-pressure saturated liquid oxygen tank is communicated with the pressurized gas through a third valve; a first outlet of the atmospheric-pressure saturated liquid oxygen tank is connected to an inlet b at the shell side of the secondary subcooler through a fourth valve; the atmospheric-pressure saturated liquid oxygen tank is provided with a second relief valve; and an outlet h at the shell side of the secondary subcooler is connected to an eighth valve;

an outlet c at the shell side of the secondary subcooler is connected to an inlet d of a gas side at a primary subcooler through a sixth valve; an outlet e at the gas side of the primary subcooler is connected to a pumping-out device through a tenth valve, a rewarming device and an eleventh valve in sequence; and the secondary subcooler is provided with a third relief valve;

a second outlet of the atmospheric-pressure saturated liquid oxygen tank is connected to an inlet n at a liquid side of the primary subcooler through a fifth valve; an outlet o at the liquid side of the primary subcooler is connected to an inlet r at a tube side of the secondary subcooler through a seventh valve; an outlet s at the tube side of the secondary subcooler is connected to an inlet of a subcooled liquid oxygen tank through a ninth valve; and the subcooled liquid oxygen tank is provided with a fourth relief valve; and connections are performed using a vacuum multilayer heat-insulated low-temperature fluid pipeline.

In an embodiment, the first, second, third, fourth, fifth, sixth, seventh, eighth, ninth, tenth and eleventh valves are cryogenic valves.

In an embodiment, the first, second, third and fourth relief valves are cryogenic relief angle valves.

In an embodiment, the atmospheric-pressure saturated liquid nitrogen tank, the atmospheric-pressure saturated liquid oxygen tank and the subcooled liquid oxygen tank are cryogenic storage tanks.

In an embodiment, the primary subcooler is a cryogenic gas-liquid heat exchanger.

In an embodiment, the secondary subcooler is a cryogenic liquid-liquid heat exchanger.

In an embodiment, the rewarming device is an ambient-air heat exchanger.

In an embodiment, the pumping-out device is a vacuum pump or an ejector with a minimum working pressure of 10 kPa.

Compared to the prior art, this disclosure has the following beneficial effects.

The application mixes the liquid oxygen and the liquid nitrogen in different proportions with reference to a low temperature phase equilibrium theory. After mixing, the temperature of the eutectic point is lower than the triple point temperature of the liquid oxygen, while the saturation pressure is much higher than that corresponding to the triple point temperature of the liquid oxygen. At this time, the performance requirements for the pumping-out device will be decreased. It is possible to decrease the temperature of the mixture of the liquid oxygen and the liquid nitrogen to below the triple point temperature of the liquid oxygen at the lower pumping-out cost, so as to deeply subcool the liquid oxygen. At the same time, the pumping-out device pumps cryogenic gas mixture that can exchange heat with the liquid oxygen with the normal boiling point again to make full use of its cold energy. The application reduces the performance requirements for the pumping-out device and is technically easy to implement. In addition, the application can greatly reduce the subcooling temperature of the liquid oxygen to the triple point temperature of the liquid oxygen and maximizes the efficiency of the liquid oxygen to obtain subcooling degree by making full of the cold energy of the extracted gas mixture. The pumping process mainly consumes more nitrogen and less oxygen, which reduces the consumption cost of the system. The system provides a new idea to obtain the larger subcooling degree of the liquid oxygen.

BRIEF DESCRIPTION OF THE DRAWINGS

This FIGURE is a schematic diagram of a system for preparing deeply subcooled liquid oxygen based on mixing of liquid oxygen and liquid nitrogen and then vacuum-pumping according to an embodiment of the present disclosure.

DETAILED DESCRIPTION OF EMBODIMENTS

The technical solutions of the present application will be further described in detail with reference to the accompanying drawing and embodiments.

Referring to the FIGURE, a system for preparing subcooled liquid oxygen based on mixing of liquid oxygen and liquid nitrogen and then vacuum-pumping includes an atmospheric-pressure saturated liquid nitrogen tank 1 and an atmospheric-pressure saturated liquid oxygen tank 5. An inlet of the atmospheric-pressure saturated liquid nitrogen tank 1 is communicated with pressurized gas through a first valve 2. An outlet of the atmospheric-pressure saturated liquid nitrogen storage tank 1 is connected to an inlet a at a shell side of a secondary subcooler 13 through a second valve 4. When the first valve 2 and the second valve 4 are opened, the pressurized gas pressurizes the atmospheric-pressure saturated liquid nitrogen tank 1 to enable atmospheric-pressure saturated liquid nitrogen in the atmospheric-pressure saturated liquid nitrogen tank 1 to flow to the inlet a at the shell side of the secondary subcooler 13. The atmospheric-pressure saturated liquid nitrogen tank 1 is provided with a first relief valve 3 to prevent the atmospheric-pressure saturated liquid nitrogen tank 1 from overpressure.

An inlet of the atmospheric-pressure saturated liquid oxygen tank 5 is communicated with the pressurized gas through a third valve 6. A first outlet of the atmospheric-pressure saturated liquid oxygen tank 5 is connected to an inlet b at the shell side of the secondary subcooler 13 through a fourth valve 8. When the third valve 6 and the fourth valve 8 are opened, the pressurized gas pressurizes the atmospheric-pressure saturated liquid oxygen tank 5 to enable atmospheric-pressure saturated liquid oxygen in the atmospheric-pressure saturated liquid oxygen tank 5 to flow to the inlet b at the shell side of the secondary subcooler 13. The atmospheric-pressure saturated liquid oxygen tank 5 is provided with a second relief valve 7 to prevent the atmospheric-pressure saturated liquid oxygen tank 5 from overpressure. An outlet h at the shell side of the secondary subcooler 13 is connected to an eighth valve 14. The eighth valve 14 is opened for venting when liquid oxygen and liquid nitrogen are mixed on the shell side of the secondary subcooler 13.

An outlet c at the shell side of the secondary subcooler 13 is connected to an inlet d at a gas side of a primary subcooler 10 through a sixth valve 11. An outlet e at the gas side of the primary subcooler 10 is connected to a pumping-out device 22 through a tenth valve 19, a rewarming device 20 and an eleventh valve 21 in sequence. The secondary subcooler 13 is provided with a third relief valve 15.

A second outlet of the atmospheric-pressure saturated liquid oxygen tank 5 is connected to an inlet n at a liquid side of the primary subcooler 10 through a fifth valve 9. An outlet o at the liquid side of the primary subcooler 10 is connected to an inlet r at a tube side of the secondary subcooler 13 through a seventh valve 12. An outlet s at the tube side of the secondary subcooler 13 is connected to an inlet of a subcooled liquid oxygen tank 17 through a ninth valve 16.

When the eighth valve 14 is closed, and the tenth valve 19 and the eleventh valve 21 are opened, the rewarming device 20 performs heat exchange and the pumping-out device 22 starts. Saturated vapor of mixture of the liquid oxygen and the liquid nitrogen is pumped from the outlet c at the shell side of the secondary subcooler 13, which exchanges heat with the liquid oxygen with a normal boiling point in the primary subcooler 10. Decrease of vapor pressure makes a temperature of the mixture of the liquid oxygen and the liquid nitrogen in the secondary subcooler 13 decrease to below a triple point temperature of the liquid oxygen. At this time, the liquid oxygen with the normal boiling point in the atmospheric-pressure saturated liquid oxygen tank 5 enters the primary subcooler 10 through the fifth valve 9 for heat exchange, so as to make full use of cooling capacity of the mixed vapor, and then is further cooled to a target subcooling temperature through the secondary subcooler 13.

When the third valve 6, the fifth valve 9, the seventh valve 12 and the ninth valve 16 are opened, the pressurized gas pressurizes the atmospheric-pressure saturated liquid oxygen tank 5 to enable the atmospheric-pressure saturated liquid oxygen to be subcooled in the atmospheric-pressure saturated liquid oxygen tank 5 to flow to the inlet n at the liquid side of the primary subcooler 10, so as to pre-cool the atmospheric-pressure saturated liquid oxygen in the primary subcooler 10. The pre-cooled atmospheric-pressure saturated liquid oxygen flows to the inlet r at the tube side of the secondary subcooler 13 from an outlet o at the liquid side of the primary subcooler 10 to enter the secondary subcooler 13. In the secondary subcooler 13, the mixture of the liquid oxygen and the liquid nitrogen with the temperature below the triple point temperature of liquid oxygen cools the pre-cooled atmospheric-pressure saturated liquid oxygen to the triple point temperature of liquid oxygen by a liquid bath. The cooled atmospheric-pressure saturated liquid oxygen flows into the subcooled liquid oxygen tank 17 from the outlet s at the tube side of the secondary subcooler 13. The subcooled liquid oxygen tank 17 is provided with a fourth relief valve 18 to prevent the subcooled liquid oxygen tank 17 from overpressure.

Connections are performed using a vacuum multilayer heat-insulated low-temperature fluid pipeline.

The first valve 2, the second valve 4, the third valve 6, the fourth valve 8, the fifth valve 9, the sixth valve 11, the seventh valve 12, the eighth valve 14, the ninth valve 16, the tenth valve 19 and the eleventh valve 21 are cryogenic valves.

The first relief valve 3, the second relief valve 7, the third relief valve 15 and the fourth relief 18 valve are cryogenic relief angle valves.

The atmospheric-pressure saturated liquid nitrogen tank 1, the atmospheric-pressure saturated liquid oxygen tank 5 and the subcooled liquid oxygen tank 17 are cryogenic storage tanks.

The primary subcooler 10 is a cryogenic gas-liquid heat exchanger.

The secondary subcooler 13 is a cryogenic liquid-liquid heat exchanger.

The rewarming device 20 is an ambient-air heat exchanger.

The pumping-out device 22 is a vacuum pump or an ejector with a minimum working pressure of 10 kPa.

The working principle of this application is performed as follows.

The triple point temperature of cryogenic refrigerant liquid oxygen is 54.4 K, and corresponding saturation pressure is 148 Pa. The pumping-out device is required to have a vacuum degree below the saturation pressure to obtain the low temperature by a suction decompression method, which causes a high cost to obtain a low vacuum environment. However, the liquid nitrogen is firstly performed suction decompression to enable the temperature of the liquid nitrogen to decrease to a triple point (63.2 K), which corresponds to a saturation pressure (12.6 kPa). This method greatly reduces the cost, but it cannot super-cool the liquid oxygen below 63.2 K. This application mixes the liquid nitrogen and the liquid oxygen in different proportions with reference to a low temperature phase equilibrium theory in view of the shortcomings of the above-mentioned two subcooling methods. Eutectic point temperature of a mixture of the two cryogenic liquids is below the triple point temperature of liquid oxygen, while the corresponding saturation pressure is around 12 kPa. At this time, it is possible to obtain the mixture of the liquid oxygen and the liquid nitrogen at the lower cost, which has a lower temperature than the triple point of liquid oxygen. The mixture of the liquid oxygen and the liquid nitrogen is used as a cooling medium of the liquid oxygen, which can subcool the liquid oxygen to near its triple point temperature to realize the subcooling of the liquid oxygen. At the same time, cold energy of extracted gaseous mixture can be made full use to further improve the efficiency of a subcooling system.

Before the atmospheric-pressure saturated liquid oxygen is subcooled, the first valve 2, the second valve 4, the third valve 6, the fourth valve 8 and the eighth valve 14 are opened. The pressurized gas respectively squeezes the liquid nitrogen (77.4 K) and the liquid oxygen (90.2 K) to the secondary subcooler 13 for mixing. Because the liquid nitrogen has a lower temperature, it firstly starts to boil to make the temperature of the liquid oxygen decrease. The nitrogen vapor has a significant increase in the proportion in the mixed vapor. Subsequently, the eighth valve 14 is closed, and the sixth valve 11, the tenth valve 19, the eleventh valve 21 are opened. The pumping-out device 22 starts to pump out of the mixture of the liquid oxygen and the liquid nitrogen on the shell side of the secondary subcooler 13. During the pumping process, the temperature and saturation pressure of the mixture is decreased along its gas-liquid saturation line. Due to the large proportion of nitrogen in the mixed vapor, the pumping process mainly consumes more nitrogen. When the vapor pressure on the shell side of the secondary subcooler 13 is decreased and maintained near the saturation pressure corresponding to the triple point temperature of the mixture, the temperature of the mixture is decreased to below the triple point temperature of liquid oxygen. The mixed gas enters the rewarming device 20 from the primary subcooler 10 for reheating to normal temperature to protect the pumping-out device 22. After the eutectic point temperature of the mixture of the liquid oxygen and the liquid nitrogen is reached, a flow path of the liquid oxygen to be subcooled is opened, that is, the third valve 6, the fifth valve 9, the seventh valve 12 and the ninth valve 16. At this time, the atmospheric-pressure saturated liquid oxygen is precooled through the primary subcooler 10 and the pre-cooled atmospheric-pressure saturated liquid oxygen is exchanged heat with the mixture of the liquid oxygen and the liquid nitrogen at the eutectic point temperature in the secondary subcooler 13. After the subcooling is completed, the subcooled atmospheric-pressure saturated liquid oxygen is stored in the subcooled liquid oxygen tank 17. The mixed vapor of oxygen and nitrogen generated in the heat exchange process is pumped out by the pumping-out device 22. The continuous consumption of oxygen and nitrogen requires the pressurized gas to continuously compress the liquid nitrogen and the liquid oxygen in the atmospheric-pressure saturated liquid nitrogen tank 1 and the atmospheric-pressure saturated liquid oxygen tank 5 to the shell side of the secondary subcooler 13.

Through principle analysis, it can be found that this application maximizes the available subcooling range of the liquid oxygen, the temperature of the liquid oxygen can be decreased to near its triple point temperature and the pumping process consumes less oxygen and mainly consumes cheap nitrogen. In addition, the pumping-out device is not needed to have a high vacuum degree and only needs to roughly pump out of the mixed vapor of the oxygen and nitrogen to maintain the pressure at about 10 kPa. Compared to the direct suction decompression, the required pumping pressure in this application is increased from 148 Pa to 10 kPa to obtain the liquid oxygen with the triple point temperature. This application is technically easy to implement and has a low cost. In addition, this application can greatly reduce the subcooling temperature of the liquid oxygen and obtain the maximum degree of subcooling of the liquid oxygen.

Described above are only illustrative of the basic principles and characteristics of this application, and are not intended to limit this application. Any modification and change made by those of ordinary skill in the art without departing from the spirit of this application shall fall within the scope of this application.

What is claimed is:

1. A system for preparing subcooled liquid oxygen based on mixing of liquid oxygen and liquid nitrogen and then vacuum-pumping, comprising:
   an atmospheric-pressure saturated liquid nitrogen tank; and
   an atmospheric-pressure saturated liquid oxygen tank;
   wherein an inlet of the atmospheric-pressure saturated liquid nitrogen tank is communicated with pressurized gas through a first valve; an outlet of the atmospheric-pressure saturated liquid nitrogen tank is connected to an inlet (a) at a shell side of a secondary subcooler through a second valve; and the atmospheric-pressure saturated liquid nitrogen tank is provided with a first relief valve;
   an inlet of the atmospheric-pressure saturated liquid oxygen tank is communicated with the pressurized gas through a third valve; a first outlet of the atmospheric-pressure saturated liquid oxygen storage tank is connected to an inlet (b) at the shell side of the secondary subcooler through a fourth valve; the atmospheric-pressure saturated liquid oxygen tank is provided with a second relief valve; and an outlet (h) at the shell side of the secondary subcooler is connected to an eighth valve;
   an outlet (c) at the shell side of the secondary subcooler is connected to an inlet (d) at a gas side of a primary subcooler through a sixth valve; an outlet (e) at the gas side of the primary subcooler is connected to an evacuating device through a tenth valve, a rewarming device and an eleventh valve in sequence; and the secondary subcooler is provided with a third relief valve;
   a second outlet of the atmospheric-pressure saturated liquid oxygen tank is connected to an inlet (n) at a liquid side of the primary subcooler through a fifth valve; an outlet (o) at the liquid side of the primary subcooler is connected to an inlet (r) of a tube side of the secondary subcooler through a seventh valve; an outlet (s) of the tube side of the secondary subcooler is connected to an inlet of a subcooled liquid oxygen storage tank through a ninth valve; and the subcooled liquid oxygen storage tank is provided with a fourth relief valve; and
   connections are performed using a vacuum multilayer heat-insulated low-temperature fluid pipeline.

2. The system of claim 1, wherein the rewarming device is an ambient-air heat exchanger.

3. The system of claim 1, wherein the evacuating device is a vacuum pump or an ejector with a working pressure being less than or equal to 10 kPa.

* * * * *